W. TUCKER.
Dynamometer.
No. 22,388.
Patented Dec. 21, 1858.
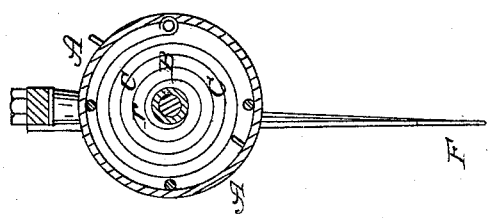
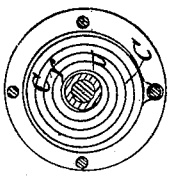
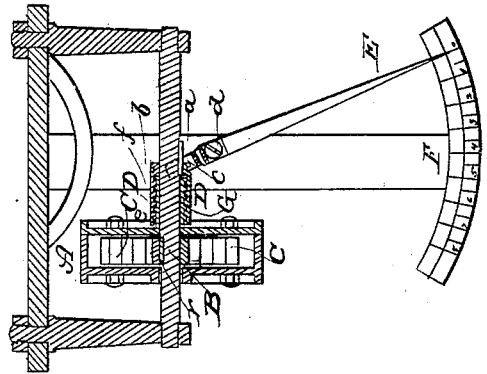
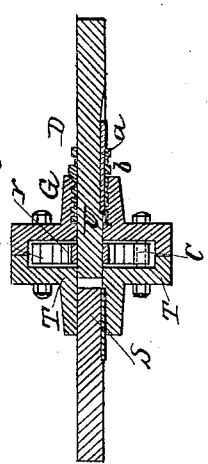
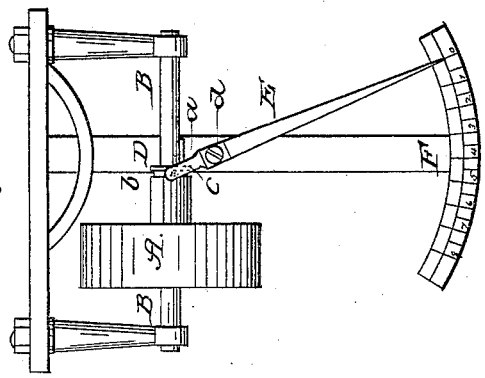
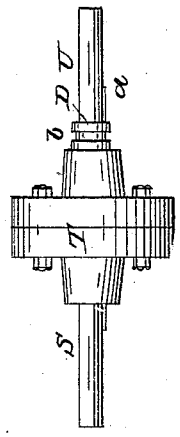
WITNESSES
INVENTOR
William Tucker

UNITED STATES PATENT OFFICE.

WILLIAM TUCKER, OF BLACKSTONE, MASSACHUSETTS.

DYNAMOMETER.

Specification of Letters Patent No. 22,388, dated December 21, 1858.

*To all whom it may concern:*

Be it known that I, WILLIAM TUCKER, of Blackstone, in the county of Worcester and State of Massachusetts, have invented an Improved Dynamometer for Measuring the Force of Rotation of Shafts; and I do hereby declare that the same is fully described and represented in the following specification and the accompanying drawings, of which—

Figure 1 is a front elevation; Fig. 2, a longitudinal section, and Fig. 3, a transverse section of the same, the plane of section being through the driving pulley. Fig. 4, is a side view; Fig. 5, a longitudinal section, and Fig. 6, a transverse section of the mode of coupling two shafts by the said instruments, when one is to drive or rotate the other, the same being in order to measure the force transmitted from the one that may be driving to that which may be driven. The first three of the figures exhibit the apparatus as applied to a driving pulley and a shaft driven by an endless belt which may be supposed to play around it.

In Figs. 1, 2, and 3, A, denotes the driving pulley and B, the shaft driven by it. The pulley though placed concentrically on the shaft, turns freely thereon and is connected to it by means of a spiral spring placed in a chamber made within the pulley. One end of the spring is attached to the shaft and the other to the pulley and in such manner that when the pulley is put in rotation its power to revolve the shaft shall be communicated through the spring. The consequence will be that the greater the resistance presented by the shaft, the more will the pulley turn on it and wind up the spring. A grooved slider, D, encompasses the shaft and slides freely in a longitudinal direction thereon it being prevented from turning on the shaft by a spline or feather $a$. It is formed with a groove $b$, cut around and in its entire periphery and to receive the fork $c$, of a bifurcated lever or index pointer E, which works against a stationary divided arc or limit, F, and turns on a fulcrum $d$. The said slider D, is connected with the pulley A, by what may be termed a screw connection G, the same consisting in a male screw, $e$, extending from the side of the pulley concentrically with the shaft and made to screw into a female screw, $f$, cut in the slider.

From the above it will be seen that while the belt is in action on the pulley, the latter will be rotated on the shaft and will wind up the spring until the force generated therein by contraction of it may be equal to the resistance of the shaft. The slightest increase of this force will cause the shaft to revolve. Now, while the pulley is revolving on the shaft, its screw $e$, will turn in the slider, which by its feather will be prevented from being revolved. Under these circumstances the slider will have a longitudinal motion imparted to it in the direction of the axis of the shaft and away from the pulley and so as to move the index lever on its fulcrum and arc. Now, if the arc has divisions on it, indicative in pounds, of the draft on the circumference of the pulley, we can easily ascertain the measure of power used in revolving the shaft. If from a cord wound on the circumference of the pulley we hang weights, of 1, 2, 3, 4, 5, &c., pounds and mark on the scale or arc the position of the index pointer we shall have the contractile force of the spring determined in pounds. Then to ascertain the number of horse power which is the measure of the resistance of the shaft, or the power operating to turn it at any time, let us suppose $a$—the number of pounds indicated on the scale at the time the power is to be determined; $b$—the circumference of the pulley in feet; $c$—the number of revolutions of the pulley, per minute. Then $$\frac{a\ b\ c}{33,000} = \text{H. P,}$$

or the number of horse power. In other words multiply the number of pounds indicated on the scale by the circumference of the pulley and the amount by the number of revolutions the pulley makes, per minute, and divide the whole by 33,000, and we shall have the result in horse power.

In Figs. 4, 5, and 6, the driving shaft S, and its coupling, T, are separate from the driven shaft, U, the shaft S, and its coupling T, being an equivalent for the pulley A, of Figs. 1, 2 and 3. The outer end of the spring, C, is attached to the coupling or the periphery of the spring chamber thereof, while the inner end of the spring is affixed to the shaft U, by means of a hub $r$. The slider, D, with the feather, $a$, and the screw connection, G, are shown in Figs. 4, 5 and 6, essentially as in Figs. 1, 2, and 3, such slider when in use having an index lever and arc applied to it to measure its longitudinal movements on the shaft. If the driving shaft is moved by means of a pulley and belt and we ascertain the number of revolutions of the pulley, per minute, we can easily calculate the power by the above mentioned rule.

This useful little dynamometric measuring apparatus can easily be employed in buildings to determine the amounts of power used in the different rooms or apartments thereof.

I claim—

The combination of the grooved slider, D, and its screw connection, G, with the index pointer, E, or its equivalent, and the spring, C, and pulley, A, or its equivalent applied to a shaft, B, substantially as described, the slider having a feather connection, a, with the said shaft as explained.

WILLIAM TUCKER.

Witnesses:
  THOS. R. THETTPLACE,
  DAVID M. WOODWARD.